Oct. 21, 1958  J. R. STRUNK  2,856,888
TIRE CHANGE AND LUBE INDICATOR DEVICE
Filed Aug. 25, 1955
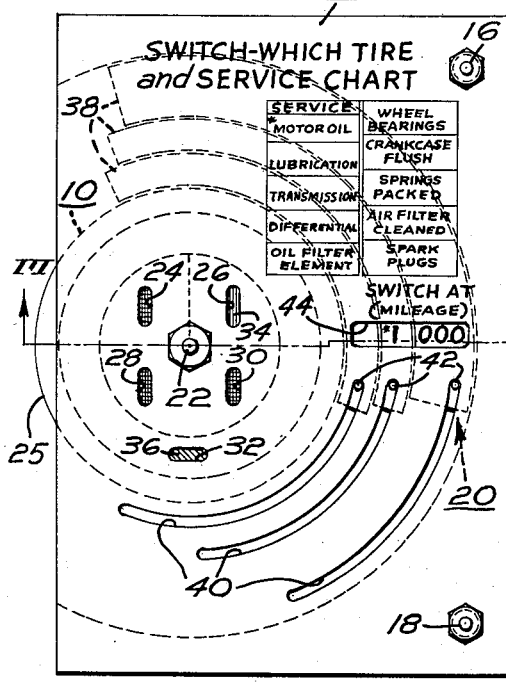
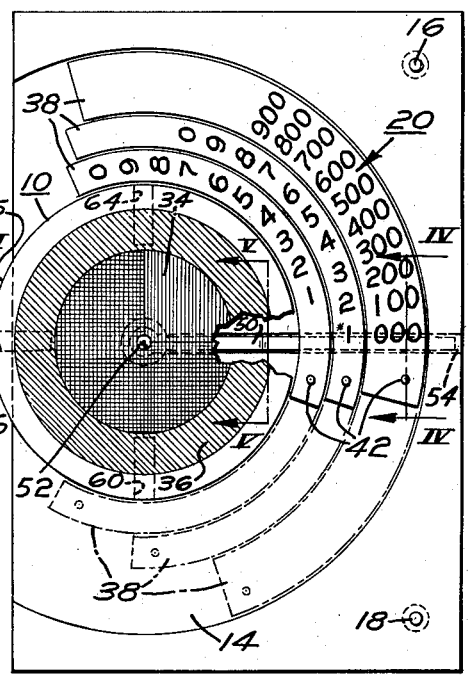
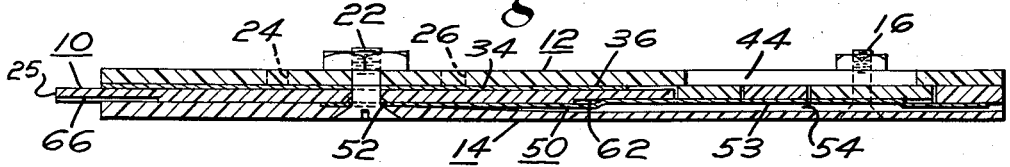
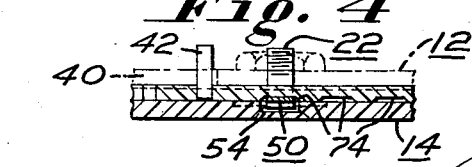
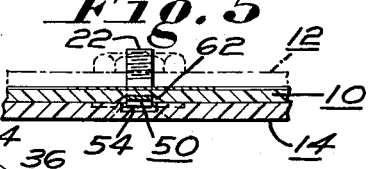
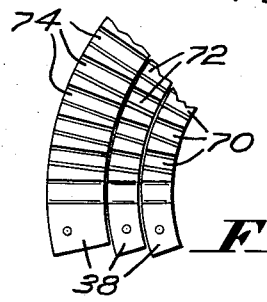
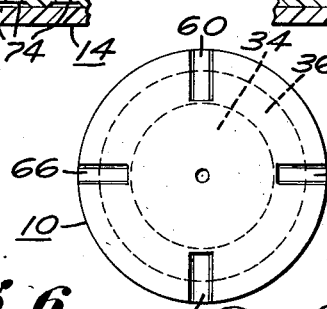
INVENTOR.
JUSTIN R. STRUNK
BY
Beau, Brooks, Buckley & Beau,
ATTORNEYS.

2,856,888

TIRE CHANGE AND LUBE INDICATOR DEVICE

Justin R. Strunk, Buffalo, N. Y.

Application August 25, 1955, Serial No. 530,439

2 Claims. (Cl. 116—133)

The present invention relates generally to indicator devices, and more particularly to a device of this type operable according to a prearranged plan for scheduling various service operations on vehicles.

A primary object of the present invention is to provide a device constructed and arranged so as to be easily manually adjustable for progressively visually indicating a proper sequence of various service operations as required for proper maintenance of a vehicle in accordance with a prearranged plan as controlled for example by the recorded readings of a vehicle odometer, or the like.

Another object of the present invention is to provide a device of the aforesaid type which will be extremely simple in operation and may be mass-produced at low unit cost.

Various other objects and advantages of the present invention will be apparent in view of the specification set forth hereinafter.

In the drawings:

Fig. 1 is a top plan view showing one form of the present invention;

Fig. 2 is a view similar to that shown in Fig. 1 but having its upper plate removed;

Fig. 3 is an enlarged sectional view taken generally along the line III—III of Fig. 1;

Fig. 4 is a fragmentary enlarged generally sectional view taken along the line IV—IV of Fig. 2;

Fig. 5 is an enlarged fragmentary generally sectional view taken along the line V—V of Fig. 2;

Fig. 6 is a fragmentary bottom plan view of the mileage indicator segments shown in Figs. 1 and 2; and, Fig. 7 is a bottom plan view of the rotatable disc shown in Figs. 1 and 2.

Referring now more particularly to the drawing, the embodiment of the present invention illustrated therein is shown to comprise a rotatable disc member 10, upper and lower plate members 12 and 14 fixed in spaced relation to each other by means of suitable fasteners such as indicated at 16 and 18, and manually adjustable arcuated mileage recording means 20 bearing numbers of the decimal system adjacent the inner face of one of the above plate members (Figs. 1 and 2).

The disc member 10 is preferably mounted on a pivot means 22 providing a pivot axis generally perpendicularly related to the upper and lower plates 12 and 14 and has a marginal edge portion 25 thereof arranged to extend outwardly from between these plates to permit manual rotation of this disc to various adjusted attitudes between the plates.

A particular feature of the present invention is to provide improved means for recording the servicing operations to be performed in accordance with a prearranged plan at each predetermined setting of the above mileage recording means 20. In the embodiment of the invention illustrated in the drawing, this is accomplished by providing four uniformly radially spaced openings 24, 26, 28 and 30 around the pivotal axis of the rotatable disc 10 as provided by the pivot means 22, and also an additional opening 32 at a point further removed from the axis of rotation inwardly of the marginal portion of the disc 10 (Fig. 1). As shown in the drawing, the four uniformly radially spaced openings 24, 26, 28, 30 are oriented to define the four corners of a rectangle, and the additional opening 32 is located adjacent one end of that rectangle. Thus, these openings will represent schematically the wheels of an automobile including its spare wheel. The central circular area 34 (Fig. 2) of the disc member 10 will underlie the openings 24 through 30, inclusive, and will preferably be subdivided into quadrant portions one of which will be treated so as to be visually distinguishable from the remaining quadrants. A marginal circular portion 36 circumjacent the central area 34 of the rotatable disc 10 will be treated in still another contrasting fashion so as to be visually distinguishable from the above central contrasting quadrant area and will be arranged to underlie the opening 32 to provide a fixed point of reference corresponding to the spare wheel of the automobile for use in accordance with the plan of operation more particularly set forth hereinafter (Figs. 1 and 2).

Thus, it will be appreciated that quarter turns of the disc 10 will permit successive identification of one of the wheel designating openings 24 to 30 in relation to the spare wheel indicator opening designated at 32. Interchange of the automobile spare wheel represented by the slot 32 with the wheel represented by the particular slot 24 to 30 beneath which the contrasting quadrant portion 34 will be positioned at certain predetermined mileage intervals as set in accordance with the plan more particularly described below will result in a uniformly balanced wear on all the vehicle tires with only one wheel interchange being required at each such predetermined interval.

By way of example, a quadrant portion of the central area 34 of the disc member 10 may be painted in a contrasting color such as red, and the circumjacent marginal portion 36 may be painted in still another contrasting color such as blue (Figs. 1 and 2). The blue marginal portion 36 will be adapted to continually travel under the spare wheel slot 32 while the red quadrant portion 34 simultaneously will appear successively under each of the other slots 24 to 30 at each quarter turn of the disc 10. In operation, the disc 10 will be adjusted so that the red quadrant portion 34 thereon will show through one of the wheel slots 24 to 30 simultaneously with setting of the mileage indicator means 20, at the mileage upon which a tire switch will be accomplished in accordance with the prearranged plan set forth herein. When this mileage indicator setting coincides with the automobile speedometer reading after a period of operation, the wheel designated schematically by the slot appearing in red on the present device will be interchanged with the spare wheel designated schematically by the slot 32 which will always be designated in blue. A similar wheel change will be successively accomplished at preferably 1000-mile intervals so that after the car has traveled 20,000 miles the tires will each have had 16,000 miles balanced wear, or ⅘ of the total mileage with only one wheel switch having been required at each 1000-mile interval, or each quarter turn of the color wheel.

A still further feature of the present invention is to provide, in combination with the rotatable wheel indicator arrangement set forth above, the improved mileage indicator means 20 mentioned above. This mileage indicator means 20 preferably includes arcuated segments 38 each being of progressively increasing radius as shown most clearly in Figs. 1, 2 and 6 so as to be adapted to cooperate adjacent each other in minimum space requirements for mileage recording purposes. These segments 38 will be arranged circumjacent the rotatable color wheel 10 and adjacent each other for selective independent movement of each thereof between the upper and lower plates 12 and 14, and will each be guided for movement around the disc member 10 by virtue of one of their ends being arranged for guided movement in a plurality of arcuated slots 40 cut in the upper plate 12 as most clearly shown in Fig. 1. The arcuated segments 38 will each be maintained in registry with their corresponding arcuated slots 40 by means of upstanding pins 42 integrally secured to the ends of the arcuated segments and fitted through each of the respective arcuated slots (Figs. 1 and 4). In order to make the numbers provided on the surface of the arcuated segments visible exteriorly of the device, there will be provided an additional opening 44 in the upper plate 12 which will be arranged to extend across the arcuated segments so that by manipulation of the latter various mileage indicator readings as required may be made visible through this opening.

It is a still further feature of the present invention to provide improved means for positively maintaining both the rotatable disc 10 and the arcuated mileage indicator segments 38 in their various positions of adjustment. These means will preferably be accomplished as shown most clearly in Figs. 2, 3, 4, 5, 6 and 7, by fashioning a flat spring member 50 to have an opening 52 at one end for connection with the disc pivot means 22 and then offsetting a medial portion of this spring upwardly into a substantially bow-spring section 53 adapted for registry with suitable notches provided both in the underside of the rotatable disc 10 and the arcuated mileage indicator strips 38. The spring 50 will preferably be retained against rotation about the pivot means 22 by virtue of being set in an elongate slot 54 provided to extend radially outwardly from the pivot means 22 in the base plate member 14. The slot 54 will also be arranged to accommodate elongations of the spring therein resulting during adjustments of the disc member 10 and the arcuated segments 38.

As shown most clearly in Fig. 7, the underside of the rotatable disc 10 will have its marginal undersurface provided with slots 60, 62, 64 and 66 at 90° intervals therearound which will radiate outwardly in the direction of the lines of demarcation between the quadrant sections of the central front face of the disc as provided in the above-described manner. The underside of the arcuated segments 38 will be provided with successive radially aligned slots 70, 72 and 74 each preferably in alignment with one of the numerals provided on the opposite face thereof. The slots in the above instances will be preferably formed with beveled side wall portions so as to facilitate camming of the bow spring portion 53 of the member 50 incidental to changing the positions of adjustment of both the disc 10 and the arcuated segments 38 for operation of the device in accordance with the method set forth herein.

It is also another feature of the present invention that the outer surface of the outer plate 12 may be provided with a suitable legend to indicate the various operations generally required to be performed in connection with servicing automobiles, or the like, and then by use of appropriate code markings each of the various service operations designated on the face of this plate may be referred to at prearranged points on the mileage indicator strips 38 as determined by the mileage at which performance of the various services will be recommended. Of course, when the appropriate code markings become visible through the opening 44 at the appropriate mileage indicator settings and these settings coincide with the vehicle odometer reading, it will serve as a warning to the user of the present device that a particular service should be performed. The back plate member 14 may also be provided with a suitable mounting arrangement for detachably securing the device of the present invention to the sun visor of the automobiles, or the like.

Therefore, while one form of the present invention has been particularly described herein, it will be apparent that various modifications and changes may be made therein without departing from the spirit of the invention or the scope of the following claims.

What is claimed is:

1. A tire change indicator device comprising a pair of pivotally connected plate members, one of said plate members having four spaced slots positioned around its point of pivotal connection and representing the wheels of a vehicle in use, a quadrant portion of the other plate member being distinctively treated for visual contrast with the remainder thereof whereby progressive relative pivotal adjustment of said plate members will bring said quadrant portion of said other plate member into positions of registry with each one of said slots successively to identify one of said wheels in use next to be interchanged with the spare wheel of said vehicle, and means adapted to lock said plate members in said successive positions of registry.

2. A tire change indicator device comprising a pair of pivotally connected plate members, one of said plate members having four spaced slots positioned around its point of pivotal connection and representing the wheels of a vehicle in use, a quadrant portion of the other plate member being distinctively treated for visual contrast with the remainder thereof whereby progressive relative pivotal adjustment of said plate members will bring said quadrant portion of said other plate member into positions of registry with each one of said slots successively to identify one of said wheels in use next to be interchanged with the spare wheel of said vehicle, and means adapted to lock said plate members in said successive positions of registry, said four spaced slots being positioned to define the corners of a rectangle, and said one plate member being provided with means positioned in the region of one end of said rectangle and adapted to represent said spare wheel.

No references cited.